May 13, 1941.  F. H. PRITCHARD  2,241,961
CONTROL SYSTEM
Filed Dec. 10, 1938
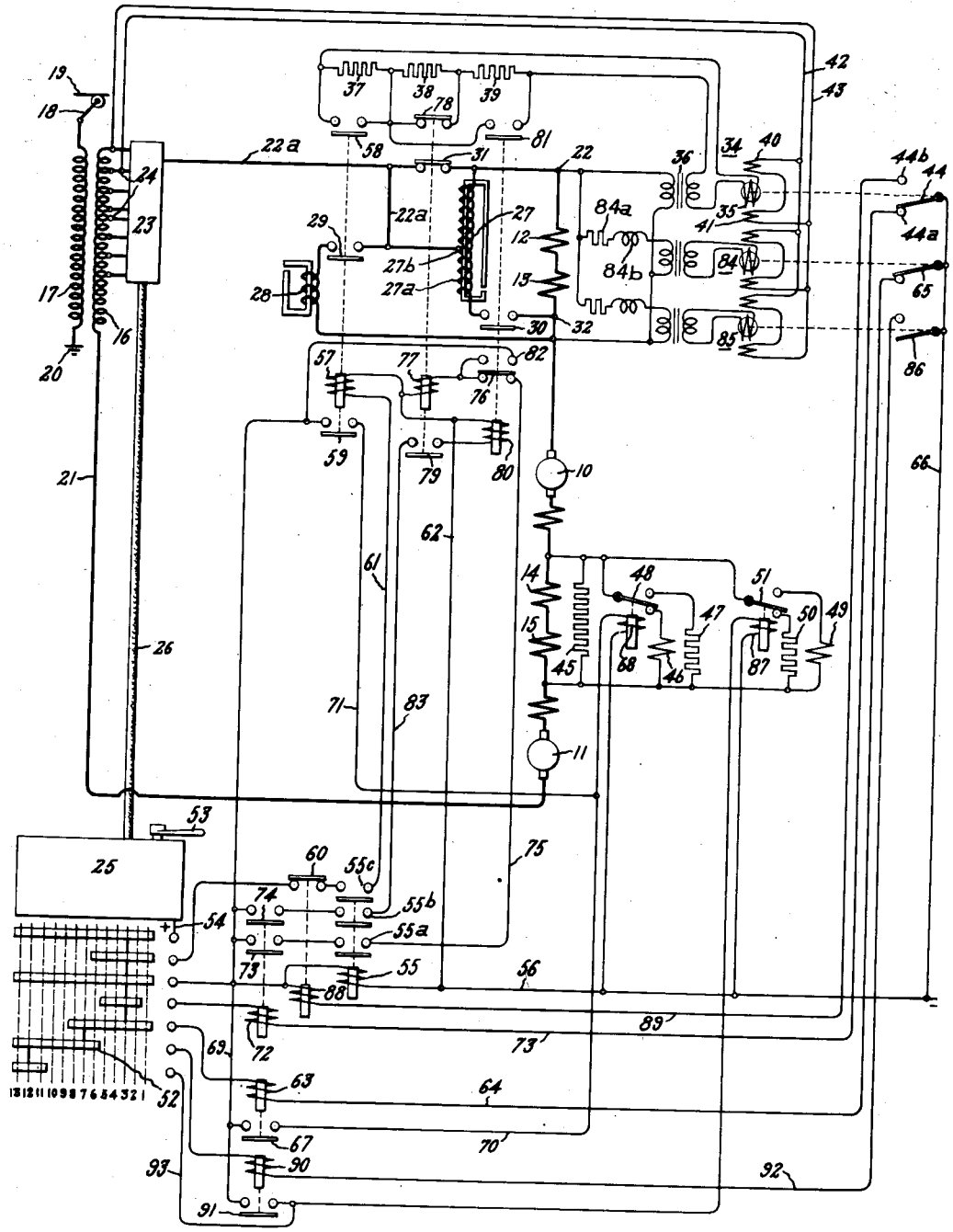
Inventor:
Franklin H. Pritchard,
by Harry E. Dunham
His Attorney.

Patented May 13, 1941

2,241,961

UNITED STATES PATENT OFFICE 2,241,961

CONTROL SYSTEM

Franklin H. Pritchard, Erie, Pa., assignor to General Electric Company, a corporation of New York Application December 10, 1938, Serial No. 244,960

19 Claims. (Cl. 172—179)

My invention relates to control systems for electric motors, more particularly to systems for controlling the acceleration of single-phase alternating current railway motors, such as used in electric locomotives, and has for its object the provision of a simple and reliable control system of this character having desired operating characteristics.

In the operation of single-phase series traction motors, the exciting field is reduced during starting, as by shunting, for the purpose of reducing the rate of acceleration and limiting to a workable value the voltage induced in the armature coils short circuited by the brushes. The decrease in the field during starting varies with the power of the motor. When the field strength is increased after the locomotive or vehicle has accelerated to a speed of a few miles an hour, a sudden increase in tractive effort results which is likely to cause wheel slippage. This increase in tractive effort is caused by the increased field strength and by the regulation of the transformer giving higher voltage with the reduced current.

It is one object of my invention to provide means for reducing the field excitation during starting in such manner as to prevent excessive torque and wheel slippage when the field strength is increased. In one form of my invention, I provide a reactive device, such as an autotransformer, in circuit with the field winding in such manner that a low value of field excitation and field impedance in the motor circuit is obtained. When the connections are changed to give a higher field excitation, the impedance of the motor circuit is increased to such an extent as to offset the tendency for the motor torque to be increased. In fact, when the change to full field is made, a slight decrease in tractive effort may be obtained.

Another object of my invention is an improved shunting arrangement for the interpole or commutating fields of single-phase traction motors, particularly an arrangement for changing the connections of the shunts wherein only a small portion of the total shunt current is interrupted by the switching means, and, furthermore, whereby the resistors in the shunt are utilized to better advantage. Also by the use of a plurality of parallel circuits, additional assurance is obtained that the shunt circuit will not be opened by an open circuit in any one of the shunting resistors or reactors.

For a more complete understanding of my invention, reference should be had to the accompanying drawing, the single figure of which shows in diagrammatic form a system of control embodying my invention.

I have shown my invention in one form as applied to the control of a single-phase alternating current motor drive for an electrical vehicle, such as an electric locomotive. The single-phase alternating current traction motors 10 and 11 are provided respectively with series exciting field windings 12 and 13 and interpole or commutating series field windings 14 and 15 and are arranged to be energized from the secondary winding 16 of a supply transformer, the primary winding 17 of which is connected by means of a trolley or pantograph 18 to a trolley wire 19. The other terminal of the primary winding 17 is connected to ground as indicated by the reference numeral 20. One terminal of the secondary winding 16 is connected by a conductor 21 directly to one terminal of the motor 11, the motors being connected with their field windings in series relation with each other. The opposite terminal 22 of the series motor circuit may be connected by means of a conductor 22a and suitable switches indicated generally by the block space 23 selectively to taps 24 on the secondary winding 16 so as to apply selected voltages to the motor circuit to give the desired acceleration and speed control.

Preferably the switches 23 are electropneumatically operated. They are controlled by a suitable manually operated controller having suitable contact segments indicated by the block space 25, the electrical connections with the switches 23 being through suitable conductors indicated by a cable 26. It is contemplated that this voltage control for the motors will be substantially as described and claimed in the U. S. Patent No. 2,064,637 to John F. Tritle, issued December 15, 1936.

In carrying out my invention, I provide impedance means for obtaining three values of excitation for the exciting windings 12 and 13. This means comprises an autotransformer 27, and a shunting reactor 28 having an iron core with an air gap giving the reactor substantially the same saturation characteristics as the motors 10 and 11. The lowest value of field excitation is given by closing the switches 29 and 30 and opening the switch 31 whereby the shunting reactor 28 is connected in parallel with the lower portion 27a of the autotransformer, i. e., the portion below the point of connection 27b of the conductor 22a with the coil of the transformer. This point as indicated is at substantially the middle of the autotransformer winding. The switch 30 connects the lower end of the autotransformer 27 to a point 32 between the exciting fields 12 and 13 and the motor 10. The upper end of the autotransformer is connected permanently to the point 22. Thus the high voltage or primary terminals of the autotransformer are connected across the field windings 12 and 13 while the low voltage portion 27a of the transformer is connected in series with the motor armature. With this connection, a low voltage is applied to the field windings 12 and 13 for minimum excitation.

For the next or intermediate excitation value, the switch 30 is opened to disable the autotransformer and the switch 31 closed, the switch 29 remaining closed. The switch 31 connects the terminal 22 of the series motor circuit through the conductor 22a directly to the selected tap on the secondary 16 while the shunting reactor 28 is connected by the switch 29 in parallel with the windings 12 and 13.

For full field the switch 29 is opened to remove the field shunting, the switch 31 remaining closed and the switch 30 remaining open.

It will be noted that with the minimum excitation connection, the lower portion 27a only of the autotransformer is connected in the motor circuit so that only approximately one-half of the exciting field voltage is in series with the motor circuit. On the other hand, the whole exciting field voltage is in series with the motor circuit for the intermediate and the high field excitations. When the connections are changed to increase the field excitation, the inclusion of the full field winding in the motor circuit results in an increased impedance in the circuit sufficient to more than offset the motor torque increasing tendency so that a slight decrease in motor torque results. In other words, the decreased armature circuit impedance with low field excitation gives an increased motor torque substantially the same or greater than the motor torque with higher field excitation and armature circuit impedance. To assure that this change from the minimum field strength to a higher field strength is made without undesirable or appreciable changes in tractive effort, the autotransformer is preferably suitably designed with an air gap in its core and for high excitation current.

The switches 29, 30 and 31 are controlled automatically in response to the speed of the locomotive, or more specifically, the speed of the motors as evidenced by the electrical condition of the motors, by means of a speed relay 34 preferably of the type described and claimed in U. S. Patent No. 1,972,688 to Jacob W. McNairy and Franklin H. Pritchard, issued September 4, 1934, and in a co-pending application of Jacob W. McNairy, Serial No. 288,371 filed August 4, 1939, assigned to the same assignee as this invention. This relay 34 has a rotor winding 35 which is connected through a transformer 36 having preferably a 1:1 ratio across the field windings 12 and 13, regulating resistances 37, 38 and 39 being included in series with each other in circuit with the relay winding 35. The relay is also provided with stator windings 40 and 41 which are connected in series with each other through conductors 42 and 43 to two selected taps on the secondary winding 16 whereby the stator windings are given a predetermined excitation. The rotor element of the relay carrying the winding 35 is mechanically connected to operate a contact arm 44 between two stationary contacts 44a and 44b.

I have also provided resistor, reactor shunting means for the commutating field windings 14 and 15. This shunting means comprises a resistor 45 connected permanently in shunt with the two series connected windings 14 and 15, a reactor 46 and a resistor 47, which may be selectively connected in parallel with the resistor 45 by means of a two-way electromagnetically operated switch 48, and a second reactor 49 and resistor 50 which may be selectively connected in parallel with the resistor 45 by a two-way electro-magnetically operated switch 51.

This system is controlled by the manually operated controller 25 through the controller segments 52 forming a part of the controller 25. When the controller is turned by its handle 53 to its first position, a suitable tap switch 23 is closed to supply a low voltage to the motors as will be understood from the aforesaid Tritle patent. In this first position also a circuit is established from the plus conductor 54 through the upper three segments of the controller 52 and the operating coil 55 to the minus wire 56 whereby the coil 55 is energized and closes its switches 55a, 55b, and 55c. The switch 55c closes a circuit for the coil 57 which operates to close its switch 29, its switch 58 which short-circuits the resistance 37, and its interlock switch 59. The circuit for the coil 57 leads through two upper segments 52, the switch 60 which is closed, the switch 55c which is closed, conductor 61, coil 57 and conductor 62 to the minus wire 56. In view of the fact that the switch 31 is normally closed and is now closed, the field windings 12 and 13 are now energized in parallel with the shunting reactor 28 for the intermediate excitation value.

Also in the first position of the controller 25, the coil 63 is energized through the fifth segment, the circuit leading through the coil, the conductor 64, a relay switch 65 which is now closed, and the conductor 66 to the minus wire 56. The coil 63 closes its switch 67 which closes the circuit for the operating coil 68 of the switch arm 48 whereby the arm is moved to its upper position to connect the resistance 47 in parallel with the resistor 45 for the low speed interpole excitation, the resistance 50 being connected also in parallel with the resistor 45 by the switch 51. This circuit leads through the first and third segments of the controller 52 to the conductor 69, through the switch 67, conductor 70 and the coil 68 to the minus wire 56. The coil 68, however, is also energized at this time from the conductor 69 through the interlock switch 59 which is closed and conductor 71.

In the second position of the controller 25, the 4th segment completes a circuit for energization of the coil 72, this circuit leading through the coil, the conductor 73, relay switch 44 and conductor 66 to the minus wire 56, the relay switch 44 being normally in engagement with its lower contact 44a when the motors are at rest or operating at low speeds.

The coil 72 closes its switches 73 and 74. The switch 73 closes a circuit from the conductor 69 through switch 55a, conductor 75, an interlock switch 76 which is closed, the operating coil 77 and conductor 62 to supply conductor 56. The coil 77 operates its switches opening the switches 31 and 78 and closing the switch 79. The switch 79 closes the circuit for the coil 80 which closes the switches 30 and 81, opens the switch 76 and closes a switch 82. The circuit for the coil 80 leads from conductor 69 through switch 74, switch 55b, conductor 83, switch 79 and coil 80 to conductor 62 and minus wire 56. The switch 82 closes a holding circuit for the coil 77 from the conductor 69 through the switch 82 to the coil and thence to the conductor 62. At this time the connections for the fields 12 and 13 are for the weakest field, the switch 31 being opened and the switches 29 and 30 being closed. Also the resistances 37, 38 and 39 are short-circuited by the switches 58 and 81 so that the speed relay 34 has its greatest sensitivity to speed change.

The connections for the field windings 12 and 13 are now controlled automatically in response to speed by the speed responsive relay 34. A similar speed responsive relay 84 having similar connections is connected to open the switch 65 in response to a predetermined speed. In order to suitably vary the phase angle a resistance 84a and reactance 84b are included in its connections to the field windings 12 and 13. A third speed responsive relay 85 of similar construction operates the switch 86 which controls an operating coil 87 for the switch 51.

Preferably the lowest speed field connections obtain for speeds up to 5 miles per hour at which speed the relay 34 opens the switch 44a whereby the coil 72 is deenergized and the switches 73 and 74 open. This deenergizes the coil 80 whereby the switches 30, 81 and 82 open and switch 76 closes. The switch 82 deenergizes the coil 77 whereby the switches 31 and 78 close and the switch 79 opens. The connections are now established for the intermediate field excitation, the field windings 12 and 13 being shunted through the reactor shunt 28.

The locomotive operates on the intermediate field excitation for track speeds from 5 to 10 miles an hour. When the track speed increases to 10 miles an hour, for example, the relay 34 brings its movable contact 44 into engagement with the contact 44b whereby a circuit is established for the coil 88, this circuit leading from the third controller segment through the coil 88, conductor 89, the contact 44b to conductor 66. The coil 88 opens its switch 60 whereby the coil 57 is deenergized and the switches 29, 58 and 59 drop open. The switch 29 opens the shunt circuit through the reactor 28 around the field windings 12 and 13. The field windings are now connected directly in the motor circuit, without shunting, for full field energization.

The opening of the switch 59 turns the circuit of the relay coil 68 over to the switch 67 which now after the establishment of full excitation for field windings 12 and 13 is controlled by the speed relay 84. When the speed reaches a predetermined value, the speed relay contact 84 opens the circuit of the coil 63 whereby the switch 67 opens and the contact 48 drops to its lowermost position thereby again to connect the reactor 46 in parallel with the resistance 45 for the intermediate speed interpole excitation, the resistance 50 being in parallel with the resistance 45. In any case, it will be observed that the coil 63 is deenergized by the controller 52 in passing from the eighth to the ninth position.

The relay 85 operates in response to a predetermined higher speed to bring its contact 86 in position to close the circuit for a coil 90 which coil closes a switch 91 thereby energizing the coil 87 which in turn moves its contact 51 to its uppermost position thereby opening the shunt circuit through the resistance 50 and connecting the reactor 49 in parallel with the resistance 45 for the high speed interpole excitation, the reactor 46 being also in parallel with the resistance 45. The circuit for the coil 90 is through the sixth segment of the controller 52 and it will be observed that the controller must be thrown to its sixth position to close the circuit which leads through the coil 90 to the conductor 92 and the contact 86 to the conductor 66. It will be observed that the controller 52 has a lowermost segment which, when the controller is turned to the 11th position, establishes a shunt circuit through a conductor 93 around the switch 91. This assures the energization of the coil 87 and the connection of the reactor 49 in parallel with the resistance 45 when the controller is in the high-speed positions, 11, 12, and 13.

It will be observed that the fourth segment of the controller 52 in passing from the fifth to the sixth position, opens the circuit of the coil 72. This is to assure the deenergization of the coil and the establishment of the intermediate speed field connections when the controller is turned to the sixth position even though the relay 34 may have failed and not opened its contact 44a to establish the intermediate speed connections. Also the controller 25 in passing to the seventh position opens the circuit of the coil 57 by means of its second segment. This assures that the high-speed field connections will be established in the seventh position in case the relay 34 fails to close its contact 44b as it should with increasing locomotive speed. These controller notches are so selected as to be beyond the point where relay 34 may normally be expected to operate, and serve as protection against operation at high speeds with weak field due to relay failure.

It will be understood that as the controller 25 is advanced tap switches 23 are selectively operated to apply higher voltages to the motors.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. The combination in a system of control for an alternating current electric motor provided with an armature and a series field winding, of means for supplying a variable voltage alternating current to said motor, means for shunting said field winding, and switching means for connecting said shunting means to said field winding to give reduced values of field excitation and of field winding impedance in the armature circuit of said motor and for connecting said armature and field winding to said supply means with increased values of field excitation and impedance in said armature circuit, said shunting means being arranged to reduce the impedance of said armature circuit with reduced field excitation to such an extent as to increase the motor torque to a value substantially equal to the motor torque with said increased values of field excitation and impedance in said armature circuit.

2. The combination in a system of control for an alternating current electric motor provided with an armature and a series field winding, of means for supplying a variable voltage alternating current to said motor, means for shunting said field winding, and switching means for connecting said shunting means to said field winding to give reduced values of field excitation and of field winding impedance in the armature circuit of said motor and for connecting said armature and field winding to said supply means with increased values of field excitation and impedance in said armature circuit, said shunting means being arranged to reduce the impedance of said armature circuit with reduced field excitation to such an extent as to increase the motor torque to a value substantially equal to the motor torque with said increased values of field excitation and impedance in said armature circuit, and motor speed responsive means for controlling said switching means.

3. The combination in a system of control for an alternating current electric motor provided with an armature and a series field winding, of means for supplying a variable voltage alternating current to said motor, means for shunting said field winding, a first switching means for connecting said shunting means to said field winding to give reduced values of field excitation and of field winding impedance in the armature circuit of said motor and for connecting said armature and field winding to said supply means with increased values of field excitation and impedance in said armature circuit, said shunting means being arranged to reduce the impedance of said armature circuit with reduced field excitation to such an extent as to increase the motor torque to a value substantially equal to the motor torque with said increased values of field excitation and impedance in said armature circuit, a second switching means for varying the voltage applied from said supply means to said motor, and a controller for controlling said first and second switching means.

4. The combination in a system of control for an alternating current electric motor provided with an armature and a series exciting field winding, of an autotransformer provided with a winding, and electrical connections including switching means for connecting said autotransformer winding across said field winding and connecting a portion of said autotransformer winding in series with said armature to give a low value of field excitation with low impedance in the circuit of said armature whereby the motor torque is substantially as great as the motor torque with said autotransformer winding disconnected and said field winding connected in series with said armature.

5. The combination in a system of control for an alternating current electric motor provided with an armature and a series exciter field winding, of an autotransformer provided with a winding, a shunt reactor, and electrical connections including switching means for connecting said autotransformer winding across said field winding, a portion of said autotransformer winding in series with said armature and said reactor in parallel with said portion of said autotransformer winding to give a low value of field excitation with low impedance in the circuit of said armature whereby the motor torque is substantially as great as the motor torque with said autotransformer winding disconnected and said field winding connected in series with said armature.

6. The combination of a system of control for an alternating current electric motor provided with an armature and an exciting series field winding, means for supplying a variable voltage alternating current to said motor, an autotransformer for controlling the excitation of said field winding from said supply means, and electrical connections including switching means for connecting the high voltage terminals of said autotransformer across said field winding and connecting a low voltage portion of said autotransformer in series with said motor armature to provide a low value of field excitation.

7. The combination in a system of control for an alternating current electric motor provided with an armature and a series field winding, means for supplying a variable voltage alternating current to said motor, an autotransformer for controlling the excitation of said field winding from said supply means, a shunt reactor, and electrical connections including switching means for connecting the high voltage terminals of said autotransformer across said field winding, connecting a low voltage portion of said autotransformer in series with the motor armature and connecting said shunt reactor in parallel with said portion of said autotransformer to provide a low value of field excitation.

8. The combination in a system of control for an alternating current electric motor provided with an armature and an exciting series field winding, means for supplying a variable voltage alternating current to said motor, an autotransformer for controlling the excitation of said field winding from said supply means, a shunt reactor, and electrical connections including switching means for connecting the high voltage terminals of said autotransformer across said field winding, energizing a portion of said autotransformer in series with the motor armature and connecting said shunt reactor in parallel with said portion of said autotransformer to provide thereby a low value of field excitation, connecting said reactor in parallel with said field winding with said autotransformer disabled to provide an intermediate value of field excitation, and connecting said field winding directly to said supply source in series with said armature for a high value of field excitation.

9. The combination with a series alternating current motor having an armature and a series field winding, means for supplying an alternating current to said motor, an autotransformer having one terminal connected to one terminal of said field winding at a point remote from said armature, a first switch for connecting the other terminal of said autotransformer to the motor circuit at a point between said field winding and said armature, a permanent connection between a terminal of said supply means and an intermediate point of said autotransformer, a second switch connecting said terminal of said supply source to said terminal of said field winding, a shunt reactor, a third switch for connecting said shunt reactor between said intermediate point of said autotransformer and said point of said motor circuit, and means for controlling said switches to give three values of excitation for said field winding from said supply source, the first and third of said switches being closed and the second open for the lowest value, the second and third being closed and the first open for an intermediate value, and the second switch being closed and the other two open for the greater value of field excitation.

10. The combination with a series alternating current motor having an armature and an exciting series field winding, means for supplying an alternating current to said motor, an autotransformer having one primary terminal connected to one terminal of said field winding at a point remote from said armature, a first switch for connecting the other primary terminal of said autotransformer to the motor circuit at a point between said field winding and said armature, a permanent connection between one terminal of said supply means and an intermediate point of said autotransformer, a second switch connecting said terminal of said supply source to said terminal of said field winding, a shunt reactor, a third switch for connecting said shunt reactor between said intermediate point of said autotransformer and said point of said motor circuit, motor speed responsive means for controlling said switches to give three values of excitation for said field winding from said supply source, the first and third of said switches being closed and the second open for the lowest value, the second and third being closed and the first open for an intermediate value and the second switch being closed and the other two open for the greater value of field excitation.

11. The combination with a series alternating current motor having an armature and an exciting series field winding, means for supplying a variable voltage alternating current to said motor, an autotransformer having one primary terminal connected to one terminal of said field winding at a point remote from said armature, a first switch for connecting the other primary terminal of said autotransformer to the motor circuit at a point between said field winding and said armature, a permanent connection between one terminal of said supply means and an intermediate point of said autotransformer, a second switch connecting said terminal of said supply source to said terminal of said field winding, a shunt reactor, a third switch for connecting said shunt reactor between said intermediate point of said autotransformer and said point of said motor circuit, motor speed responsive means for controlling said switches to give three values of excitation for said field winding from said supply source, the first and third of said switches being closed and the second open for the lowest value, the second and third being closed and the first open for an intermediate value and the second switch being closed and the other two open for the greatest value of field excitation, and means for controlling said supply means to provide a plurality of voltages for acceleration of said motor and for controlling said switches.

12. The combination in a system of control for an alternating current electric motor, of a field winding for said motor, a resistance connected in parallel circuit relation with said field winding, a second resistance, a reactor, and motor speed responsive means for selectively connecting said second resistance and said reactor in parallel circuit relation with said first resistance.

13. The combination in a system of control for an alternating current electric motor, of a field winding for said motor, a resistance connected in parallel circuit relation with said field winding, a second resistance, a reactor, and controller means for selectively connecting said second resistance and said reactor in parallel circuit relation with said first resistance.

14. The combination in a system of control for an alternating current electric motor, of an interpole field winding for said motor, a resistance connected in parallel circuit relation with said interpole winding, a pair of resistances, a pair of reactors, and motor speed responsive means for selectively connecting said pair of resistances and said reactors in parallel circuit relation with said first resistance.

15. The combination in a system of control for an alternating current electric motor, of an interpole field winding for said motor, a resistance connected permanently in parallel circuit relation with said interpole winding, a second resistance, a third resistance, a pair of reactors, a controller for supplying a varying voltage to said motor to vary the speed of said motor, and switching means operated by said controller for selectively connecting said second and third resistances and said reactors in parallel circuit relation with said first resistance.

16. The combination in a system of control for an alternating current electric motor, of an interpole field winding for said motor, a resistance connected permanently in parallel circuit relation with said interpole winding, a reactor, a second resistance, switching means for selectively connecting said reactor and said second resistance in parallel circuit relation with said first resistance, a second reactor, a third resistance, a second switching means for selectively connecting said second reactor and said third resistance in parallel circuit relation with said first resistance, and motor speed responsive means for selectively operating said switching means to connect said second and third resistances in parallel with said first resistance for low motor speeds, said first reactor and said second resistance in parallel with said first resistance for an intermediate speed, and said two reactors in parallel with said first resistance for a high motor speed.

17. The combination in a system of control for an alternating current electric motor, of an interpole field winding for said motor, a resistance connected permanently in parallel circuit relation with said interpole winding, a reactor, a second resistance, switching means for selectively connecting said reactor and said second resistance in parallel circuit relation with said first resistance, a second reactor, a third resistance, a second switching means for selectively connecting said second reactor and said third resistance in parallel circuit relation with said first resistance, and motor speed responsive means for selectively operating said switching means to connect said second and third resistances in parallel with said first resistance for low motor speeds, said first reactor and said second resistance in parallel with said first resistance for an intermediate speed, and said two reactors in parallel with said first resistance for a high motor speed, and a controller for supplying a varying voltage to said motor to vary the speed of said motor and for operating said switching means.

18. The combination with a series alternating current motor having an armature, an exciting series field winding and an interpole series field winding, means for supplying variable voltage alternating current to said motor, switching means for varying the excitation of said exciting field winding, a second switching means for varying the excitation of said interpole field winding, a controller movable to energize said motor with weak excitation of said exciting field winding, means responsive to the speed of said motor for operating said first switching means to establish full excitation of said exciting field winding at a predetermined motor speed and for thereafter operating said second switching means at higher motor speeds to control said interpole field winding, and means operated by said first switching means for operating said second switching means to a predetermined position until full field excitation of said series winding has been established.

19. The combination with a series alternating current motor having an armature, an exciting series field winding and an interpole series field winding, means for supplying a variable voltage alternating current to said motor, an autotransformer having one primary terminal connected to one terminal of said series field winding at a point remote from said armature, a first switch for connecting the other primary terminal of said autotransformer to the motor circuit at a point between said series field winding and said armature, a permanent connection between one terminal of said supply means and an intermediate point of said autotransformer, a second switch connecting said terminal of said supply source to said terminal of said series field winding, a shunt reactor, a third switch for connecting said shunt reactor between said intermediate point of said autotransformer and said point of said motor circuit, motor speed responsive means for controlling said switches to give three values of excitation for said series field winding, the first and third of said switches being closed and the second open for the lowest value, the second and third being closed and the first open for an intermediate value, and the second switch being closed and the other two open for the greatest value of field excitation, a resistance connected permanently in parallel circuit relation with said interpole field winding, a reactor, a second resistance, switching means for selectively connecting said reactor and said second resistance in parallel circuit with said first resistance, means actuated by said third switch for operating said switching means to connect said second resistance in parallel with said first resistance when said third switch is closed, speed responsive means for selectively operating said switching means when said third switch is open, and a controller for supplying a varying voltage to said motor.

FRANKLIN H. PRITCHARD.